United States Patent [19]
Hartvigsen et al.

[11] Patent Number: 5,826,058
[45] Date of Patent: Oct. 20, 1998

[54] METHOD AND APPARATUS FOR PROVIDING AN EXTERNAL INDICATION OF INTERNAL CYCLES IN A DATA PROCESSING SYSTEM

[75] Inventors: Jay A. Hartvigsen; Chinh H. Le; Wallace B. Harwood, III, all of Austin, Tex.

[73] Assignee: Motorola, Inc., Schaumburg, Ill.

[21] Appl. No.: 458,390

[22] Filed: Jun. 2, 1995

[51] Int. Cl.⁶ .............................. G06F 9/455; G06F 3/00
[52] U.S. Cl. .................................. 395/500; 395/183.13
[58] Field of Search ........................... 395/183.1, 183.14, 395/800, 500, 575, 183.01, 183.13

[56] References Cited

U.S. PATENT DOCUMENTS

| | | | |
|---|---|---|---|
| 4,674,089 | 6/1987 | Ponet et al. | 371/25 |
| 5,053,947 | 10/1991 | Allison et al. | 364/200 |
| 5,313,583 | 5/1994 | Yokota et al. | 395/275 |
| 5,361,348 | 11/1994 | Nakamoto | 395/575 |
| 5,488,688 | 1/1996 | Gonzales et al. | 395/183.1 |
| 5,493,723 | 2/1996 | Beck et al. | 395/500 |
| 5,560,036 | 9/1996 | Yoshida | 395/800 |

OTHER PUBLICATIONS

Motorola, Inc., M68HC16 Family, "CPU16 Central Processor Unit Reference Manual," 1993, pp. 6–147.
Motorola, Inc., Modular Microcontroller Family, "SIM–System Intergration Module Reference Manual," 1992, pp. 4–13; 5–34 to 5–35; 5–58; 5–59; A–14.
Motorola, Inc., Modular Microcontroller Family, "SCIM–Single–Chip Intergration Module Reference Module," 1993, pp. 4–16; 5–35; 5–43; 5–61; 5–62, 7–19 to 7–20; A–16 to A–17.
Motorola, Inc., MC8HC16 Family, "MC68HC161Y1 User's Manual," 1993, pp. 4–33 to 4–34; 4–36; 4–42; 4–72.
Motorola, Inc., MC68H16 Family, "MC68HC16Z1 User's Manual," 1992, pp. 4–46; 4–50; 4–59; 4–60.
Motorola, Inc., M68300 Family, "MC68332 User's Manual," 1993, pp. 4–32 to 4–33; 4–36; 4–43.
Motorola, Inc., M68300 Family, "CPU32 Central Processor Unit Reference Manual," 1990, pp. 4–90.

*Primary Examiner*—Jack B. Harvey
*Assistant Examiner*—David A. Wiley
*Attorney, Agent, or Firm*—Susan C. Hill

[57] ABSTRACT

A method and apparatus for providing an external indication of internal cycles in a data processing system (10) in order to more easily debug software being executed by data processing system (10). In one embodiment, data processing system (10) provides cycle type signals (14) external to data processing system (10). The cycle type signals (14) can be used to determine a variety of information about the activity and bus cycles being performed within data processing system (10), activity which is not readily discernible except by way of the cycle type signals (14). In some cases the information provided by the cycle type signals (14) is sufficient for debug purposes; in other cases, information from additional signals, e.g. the address type signals (15) and the read/write signal (19) may also be required.

22 Claims, 8 Drawing Sheets

| VSYNC SIGNAL 29 | ISHOW REGISTER BITS 102 | SEQUENTIAL FETCHES | FETCHES DESTINATION OF DIRECT CHANGE OF FLOW | FETCHES DESTINATION OF EXCEPTIONS AND INDIRECT CHANGE OF FLOW | SUMMARY |
|---|---|---|---|---|---|
| 0 OR 1 | 00 | YES | YES | YES | (ALL FETCHES) |
| 0 OR 1 | 01 | NO | YES | YES | (ALL CHANGE OF FLOW) |
| 0 OR 1 | 10 | NO | NO | YES | (INDIRECT CHANGE OF FLOW) |
| 0 | 11 | NO | NO | NO | (DISABLED) |
| 1 | 11 | NO | NO | YES | (INDIRECT CHANGE OF FLOW) |

EFFECT OF ISHOW REGISTER BITS 102 ON SHOW CYCLES FROM INSTRUCTION BUS 50

FIG.8

| EFFECT OF LSHOW REGISTER BITS 100 ON SHOW CYCLES FROM LOAD/STORE BUS 51 | | | |
|---|---|---|---|
| LSHOW REGISTER BITS 100 | LOADS (READS) | STORES (WRITES) | SUMMARY |
| 00 | NO | NO | (DISABLED) |
| 01 | NO | YES | (WRITES) |
| 10 | YES | NO | (READS) |
| 11 | YES | YES | (ALL BUS CYCLES) |

*FIG.9*

| ENCODINGS FOR ADDRESS TYPE (AT) PINS 15 (SEE FIG.1) | | |
|---|---|---|
| AT[0] | AT[1] | ADDRESS SPACE DEFINITIONS |
| 0 | 0 | USER, DATA |
| 0 | 1 | USER, INSTRUCTION |
| 1 | 0 | SUPERVISOR, DATA |
| 1 | 1 | SUPERVISOR, INSTRUCTION |

*FIG.10*

ENCODINGS FOR CYCLE TYPE (CT) PINS 14 (SEE FIG.1)

| CT[0:3] | CYCLE TYPES | DESCRIPTION |
|---|---|---|
| 0000 | NORMAL | THIS IS A NORMAL EXTERNAL BUS CYCLE. IT IS USED WHEN NONE OF THE CYCLE TYPES DESCRIBED BELOW APPLY. |
| 0001 | RESERVATION CYCLE (ADDRESS TYPE IS DATA) OR EXTERNAL VISIBILITY (ADDDRESS TYPE IS INSTRUCTION) | IF THE ADDRESS TYPE IS DATA (AT[1]=0), THEN THIS IS A RESERVATION ACCESS TO EXTERNAL BUS 12 (LOAD WITH RESERVE OPERATION OR STORE CONDITIONAL OPERATION).<br><br>IF THE ADDRESS TYPE IS INSTRUCTION (AT[1]=1), THEN THIS IS AN EXTERNAL VISIBILITY CYCLE. THIS CYCLE TYPE IS USED DURING AN INSTRUCTION FETCH WHEN THE EXTERNAL ADDRESS IS THE DESTINATION OF AN INDIRECT CHANGE OF PROGRAM FLOW. IT IS ALSO USED WHENEVER THERE IS A CHANGE IN THE STATE OF THE VSYNC SIGNAL. |
| 0010 | EMULATION MEMORY SELECT | THIS IS A SPECIAL EXTERNAL BUS CYCLE TO EXTERNAL MEMORY REPLACING AN ACCESS TO MEMORY ON INTERNAL INSTRUCTION BUS 50 (E.G. TO MEMORY 38) OR LOAD/STORE BUS 51 (E.G. TO MEMORY 42). AN INSTRUCTION FETCH WITH THIS CYCLE TYPE INDICATES THAT THE EXTERNAL ADDRESS IS THE DESTINATION OF AN INDIRECT CHANGE OF PROGRAM FLOW BY SIGNALING A WRITE ON READ/WRITE SIGNAL 19. |
| 0011 | PORT REPLACEMENT UNIT SELECT | THIS IS A NORMAL EXTERNAL BUS CYCLE ACCESS TO AN EXTERNAL PORT REPLACEMENT UNIT (PRU) WHICH REPLACES INTERNAL REGISTERS FOR DEBUGGING PURPOSES. |

*FIG.11*

CONTINUATION OF ENCODINGS FOR CYCLE TYPE (CT) PINS 14 (SEE FIG.1)

| CT[0:3] | CYCLE TYPES | DESCRIPTION |
|---|---|---|
| 0100 | MEMORY ON INSTRUCTION BUS 50 (E.G. MEMORY 38) | THESE ENCODINGS INDICATES THAT AN ACCESS WAS MADE TO AN ADDRESS ON THE INTERNAL INSTRUCTION BUS 50 (E.G. TO MEMORY 38) OR LOAD/STORE BUS 51 (E.G. TO MEMORY 42) AND THAT A CACHE HIT DID NOT OCCUR. AN INSTRUCTION FETCH WITH THIS CYCLE TYPE |
| 0101 | MEMORY ON LOAD/STORE BUS 51 (E.G. MEMORY 42) | INDICATES THAT THE EXTERNAL ADDRESS IS THE DESTINATION OF AN INDIRECT CHANGE OF PROGRAM FLOW BY SIGNALING A WRITE ON READ/WRITE SIGNAL 19. |
| 0110 | EXTERNAL MEMORY NOT USING A CHIP SELECT RESULTS IN CACHE HIT | THIS INDICATES THAT AN ACCESS WAS MADE TO AN ADDRESS ON EXTERNAL BUS 12 AND THAT A CACHE HIT OCCURRED. AN INSTRUCTION FETCH WITH THIS CYCLE TYPE INDICATES THAT THE EXTERNAL ADDRESS IS THE DESTINATION OF AN INDIRECT CHANGE OF PROGRAM FLOW BY SIGNALING A WRITE ON READ/WRITE SIGNAL 19. |
| 0111 | INTERNAL REGISTER | THIS INDICATES THAT AN ACCESS WAS MADE TO A CONTROL REGISTER OR TO AN INTERNAL ADDRESS ON INTERMODULE BUS 52. |

*FIG.12*

| CONTINUATION OF ENCODINGS FOR CYCLE TYPE (CT) PINS 14 (SEE FIG.1) | | |
|---|---|---|
| CT[0:3] | CYCLE TYPES | DESCRIPTION |
| 1000 | EXTERNAL MEMORY CACHE HIT TO CHIP SELECT REGION 0 | THESE ENCODINGS INDICATES THAT AN ACCESS WAS MADE TO AN ADDRESS ON EXTERNAL BUS 12 AND THAT A CACHE HIT OCCURRED. AN INSTRUCTION FETCH WITH THIS CYCLE TYPE INDICATES THAT THE EXTERNAL ADDRESS IS THE DESTINATION OF AN INDIRECT CHANGE OF PROGRAM FLOW BY SIGNALING A WRITE ON READ/WRITE SIGNAL 19. |
| 1001 | EXTERNAL MEMORY CACHE HIT TO CHIP SELECT REGION 1 | |
| 1010 | EXTERNAL MEMORY CACHE HIT TO CHIP SELECT REGION 2 | |
| 1011 | EXTERNAL MEMORY CACHE HIT TO CHIP SELECT REGION 3 | |
| 1100 | EXTERNAL MEMORY CACHE HIT TO CHIP SELECT REGION 4 | |
| 1101 | EXTERNAL MEMORY CACHE HIT TO CHIP SELECT REGION 5 | |
| 1110 | INSTRUCTION MEMORY (E.G. MEMORY 38) CACHE HIT | THIS ENCODING INDICATES THAT AN ACCESS WAS MADE TO AN ADDRESS ON THE INTERNAL INSTRUCTION BUS 50 (E.G. TO MEMORY 38) AND THAT A CACHE HIT OCCURED. AN INSTRUCTION FETCH WITH THIS CYCLE INDICATES THAT THE EXTERNAL ADDRESS IS THE DESTINATION OF AN INDIRECT CHANGE OF PROGRAM FLOW BY SIGNALING A WRITE ON READ/WRITE SIGNAL 19. |
| 1111 | LOAD/STORE MEMORY (E.G. MEMORY 42) CACHE HIT | THIS ENCODING INDICATES THAT AN ACCESS WAS MADE TO AN ADDRESS ON THE INTERNAL LOAD/STORE BUS 51 (E.G. TO MEMORY 42) AND THAT A CACHE HIT OCCURED. AN INSTRUCTION FETCH WITH THIS CYCLE INDICATES THAT THE EXTERNAL ADDRESS IS THE DESTINATION CHANGE OF PROGRAM FLOW BY SIGNALING A WRITE ON READ/WRITE SIGNAL 19. |

*FIG.13*

METHOD AND APPARATUS FOR PROVIDING AN EXTERNAL INDICATION OF INTERNAL CYCLES IN A DATA PROCESSING SYSTEM

REFERENCE TO RELATED APPLICATIONS

The present application is related to the following U.S. patent application:

"Method And Apparatus For Controlling Show Cycles In A Data Processing System", invented by Jay Hartvigsen et al., Ser. No. 08/460,484, filed concurrently herewith, and assigned to the assignee hereof.

FIELD OF THE INVENTION

The present invention relates in general to a data processing system, and more particularly to a method and apparatus for providing an external indication of internal cycles in a data processing system.

BACKGROUND OF THE INVENTION

Data processing systems, such as microcontroller integrated circuits, may have an internal bus which transfers address, data, and/or control information during internal bus cycles. In order to facilitate hardware testing and software program debugging, it is useful for the microcontroller to provide internal bus cycle information to the microcontroller's external bus. In this manner, test and debug equipment external to the microcontroller is able to monitor the address, data, and control information which is being transferred across the internal bus within a microcontroller. Thus, the activity of the internal bus is made visible to the world outside of the integrated circuit.

Various names may be given to the special external bus cycles which are used to provide the internal bus information. One such name is "show cycles", also written as "showcycles". A show cycle is a type of external bus cycle which conveys address, and/or data, and/or control information from a corresponding internal bus cycle, where the corresponding internal bus cycle did not require use of the external bus. For example, the corresponding internal bus cycle may be an access to an internal resource, such as an on-chip memory, which does not require use of the external bus. These special external bus cycles "show" the activity of the internal bus on the external bus where the activity can be more easily monitored.

As an example, some members of the MC68HC16 and MC68300 families of microcontrollers, available from Motorola, Inc. of Austin, Tex., are able to provide show cycles on the external bus. Some members of the MC68HC16 and MC68300 families of microcontrollers have function code pins, chip select pins, and strobe pins which are used to convey information about the current bus cycle being performed on the external bus. However, for microcontrollers which have multiple internal busses, which have internal caches, and which do not provide all address signal externally, the existing function code pins, chip select pins, and strobe pins do not provide enough information to easily enable the task of debugging software being executed by the microcontroller. A solution was needed to ease the task of debugging software being executed by the microcontroller, while not significantly impacting the internal operation, speed, and integrated circuit pin count of the microcontroller.

DESCRIPTION OF THE PREFERRED EMBODIMENT

Figure 1:
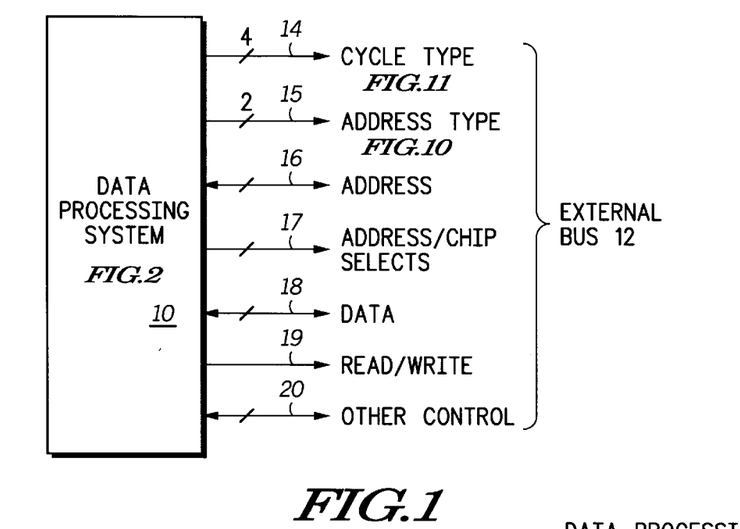
FIG. 1 illustrates, in block diagram form, a data processing system 10 and external bus 12 in accordance with one embodiment of the present invention.
Figure 11:
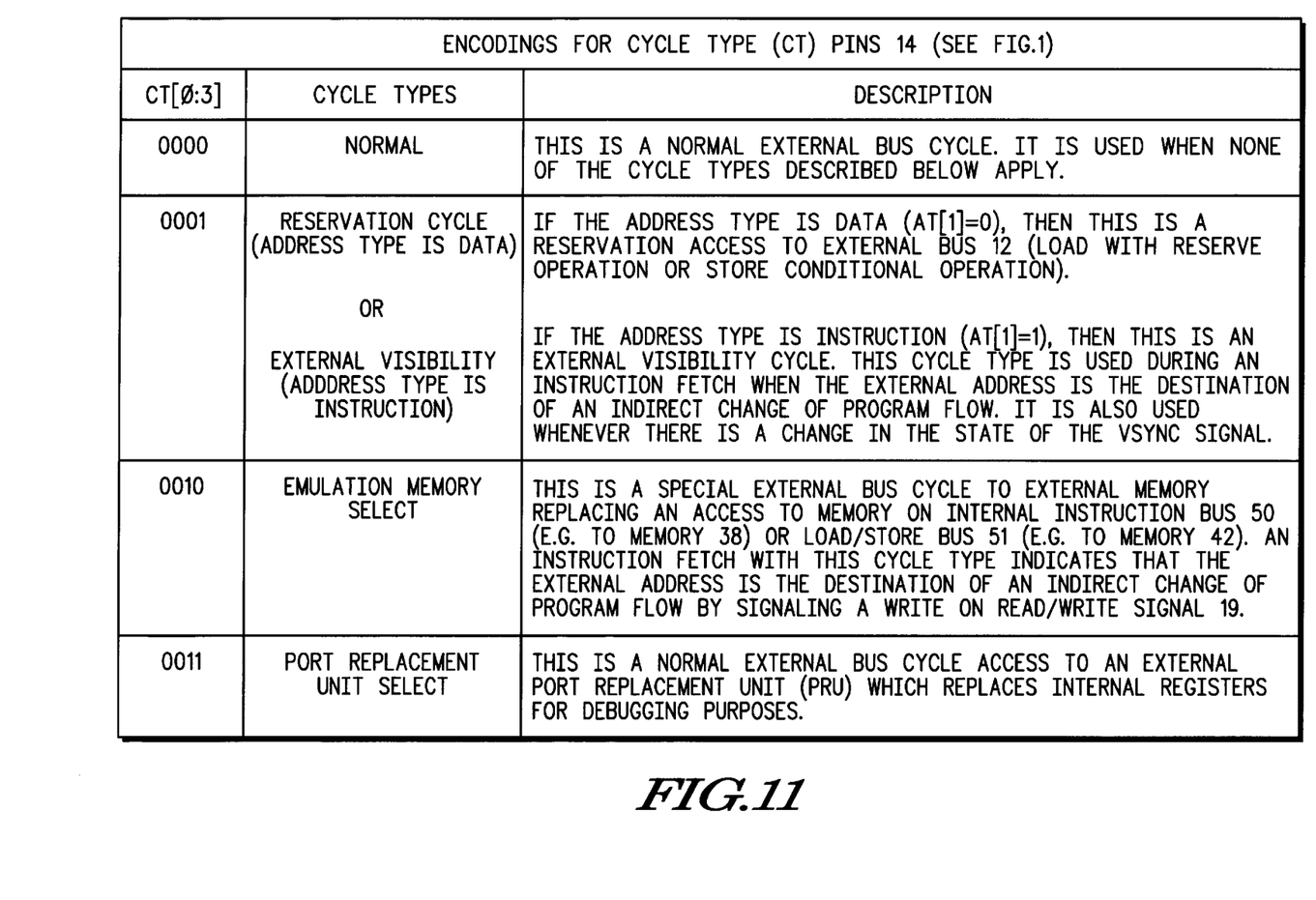
FIG. 11 illustrates, in tabular form, the encodings for the cycle type integrated circuit terminals 14 of FIG. 1 in accordance with one embodiment of the present invention.
Figure 12:
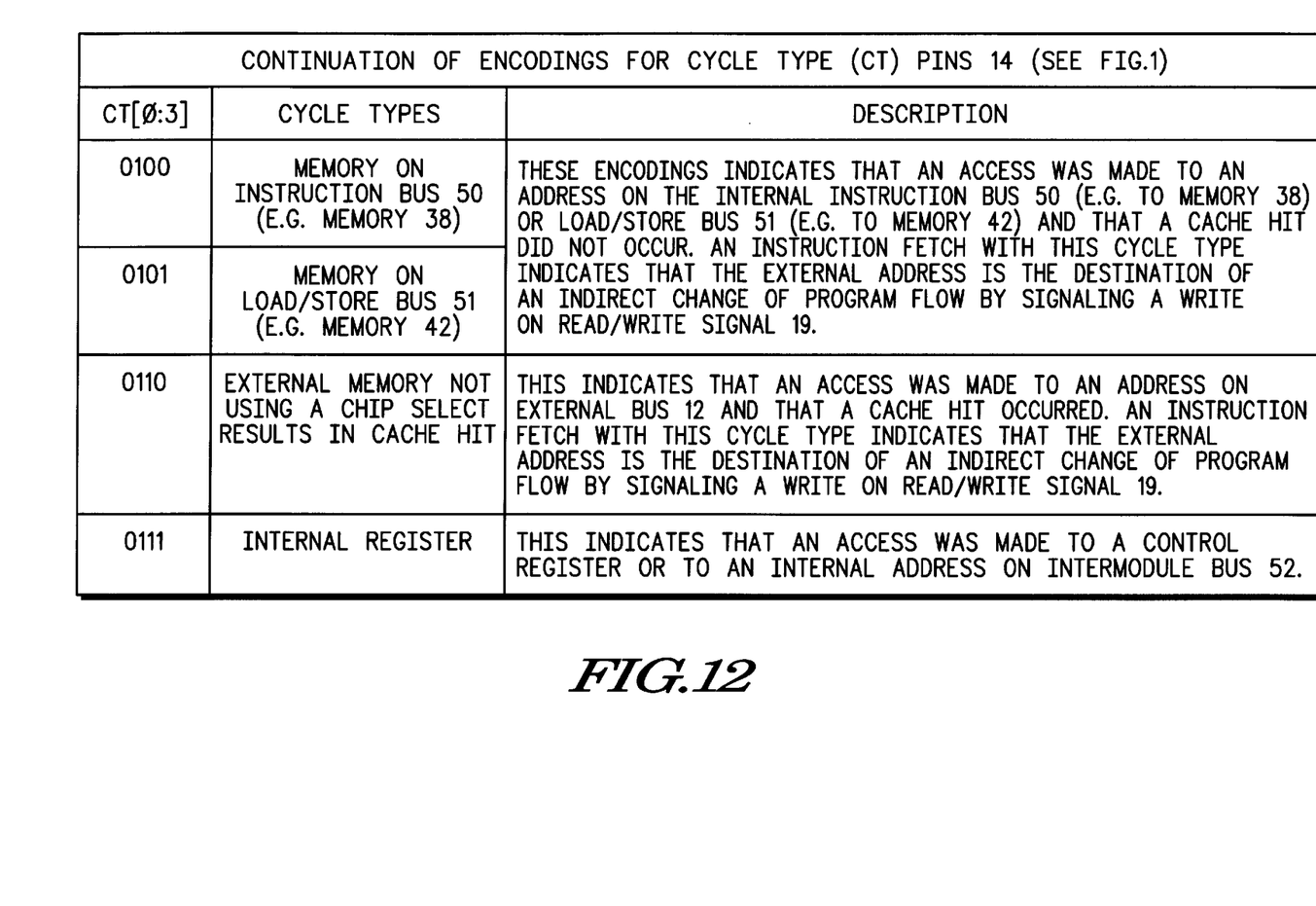
FIG. 12 illustrates, in tabular form, a continuation of the encodings for the cycle type integrated circuit terminals 14 of FIG. 1 in accordance with one embodiment of the present invention.

The present invention provides a method and apparatus for more easily debugging software being executed by a data processing system 10. Referring to FIG. 1, data processing system 10 provides cycle type signals 14 external to data processing system 10. External debugging hardware and software (not shown) can use the cycle type signals 14 to determine a variety of information about the activity and bus cycles being performed within data processing system 10, activity which is not readily discernible except by way of the cycle type signals 14. In some cases the information provided by the cycle type signals 14 is sufficient for debug purposes; in other cases, information from additional signals (e.g. the address type signals 15 and the read/write signal 19) may also be required. The encodings of the cycle type signals 14 for one embodiment of the present are illustrated in FIGS. 11 and 12. Of course, alternate embodiments of the present invention may use different encodings and may reduce or augment the information being provided by way of cycle type signals 14.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. The symbol "%" preceding a number indicates that the number is represented in its binary or base two form. A bracket will be used to designate individual bits of a multi-bit value or signal. For example "AT[0]" represents bit 0 of the address type signals, and "CT[0:3]" represents bits 0 through 3 of the cycle type signals.

DESCRIPTION OF THE FIGURES

FIG. 1 illustrates a data processing system 10 which is bi-directionally coupled to an external bus 12. In one embodiment of the present invention, external bus 12 includes the following signals: cycle type signals which are transferred by way of conductors 14; address type signals which are transferred by way of conductors 15, address signals which are transferred by way of conductors 16, address/chip select signals which are transferred by way of conductors 17, data signals which are transferred by way of conductors 18, a read/write signal which is transferred by way of conductor 19, and other control signals which are transferred by way of conductors 20. In one embodiment of the present invention, the address signals 16, the data signals 18, and the other control signals 20 are bidirectional, while the remaining signals are provided by data processing system 10 to external bus 12.

Figure 2:
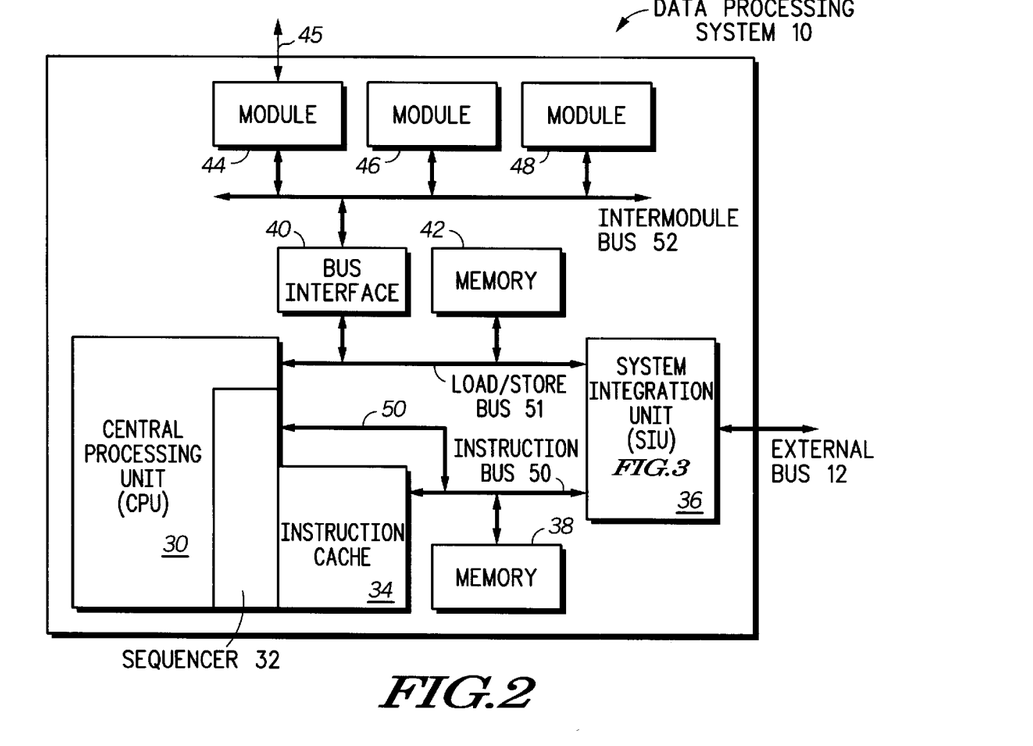
FIG. 2 illustrates, in block diagram form, a data processing system 10 of FIG. 1 in accordance with one embodiment of the present invention.

FIG. 2 illustrates a data processing system 10 of FIG. 1 in accordance with one embodiment of the present invention. In one embodiment of the present invention, data processing system 10 has a central processing unit (CPU) 30, which includes a sequencer 32. CPU 30 is closely coupled to instruction cache 34. In one embodiment, data processing system 10 includes three internal busses, namely intermodule bus 52, load/store bus 51, and instructions bus 50. Data processing system also includes system integration unit (SIU) 36, memory 42, memory 38, and bus interface 40. In addition, data processing system 10 includes modules 44, 46, and 48 which are all bi-directionally coupled to intermodule bus 52. Modules 44, 46, and 48 may include a timer module, a serial interface module, a memory module, an analog-to-digital conversion module, or any other type of module. One or more of Modules 44, 46, and 48 may be coupled external to data processing system 10 by way of one or more integrated circuit terminals. For example, in one embodiment of the present invention, module 44 can be used as a port which is bi-directionally coupled external to data processing system 10 by way of integrated circuit terminals 45.

Intermodule bus 52 and load/store bus 51 are both bi-directionally coupled to bus interface 40. Bus interface 40 is used to transfer information between intermodule bus 52 and load/store bus 51. Memory 42 is bi-directionally coupled to load/store bus 51, and memory 38 is bi-directionally coupled to instruction bus 50. Memory 38 may be any type of memory; likewise, memory 42 may be any type of memory. In alternate embodiments of the present invention, circuits 38 and 42 may be any type of module, including non-memory modules. CPU 30 is bi-directionally coupled to both load/store bus 51 and instruction bus 50. SIU 36 is bi-directionally coupled to both load/store bus 51 and instruction bus 50. SIU 36 is also bi-directionally coupled to external bus 12. In one embodiment of the present invention, data processing system 10 is formed on a single integrated circuit, and external bus 12 is used to communicate with devices (not shown) that are external to the integrated circuit.

Figure 3:
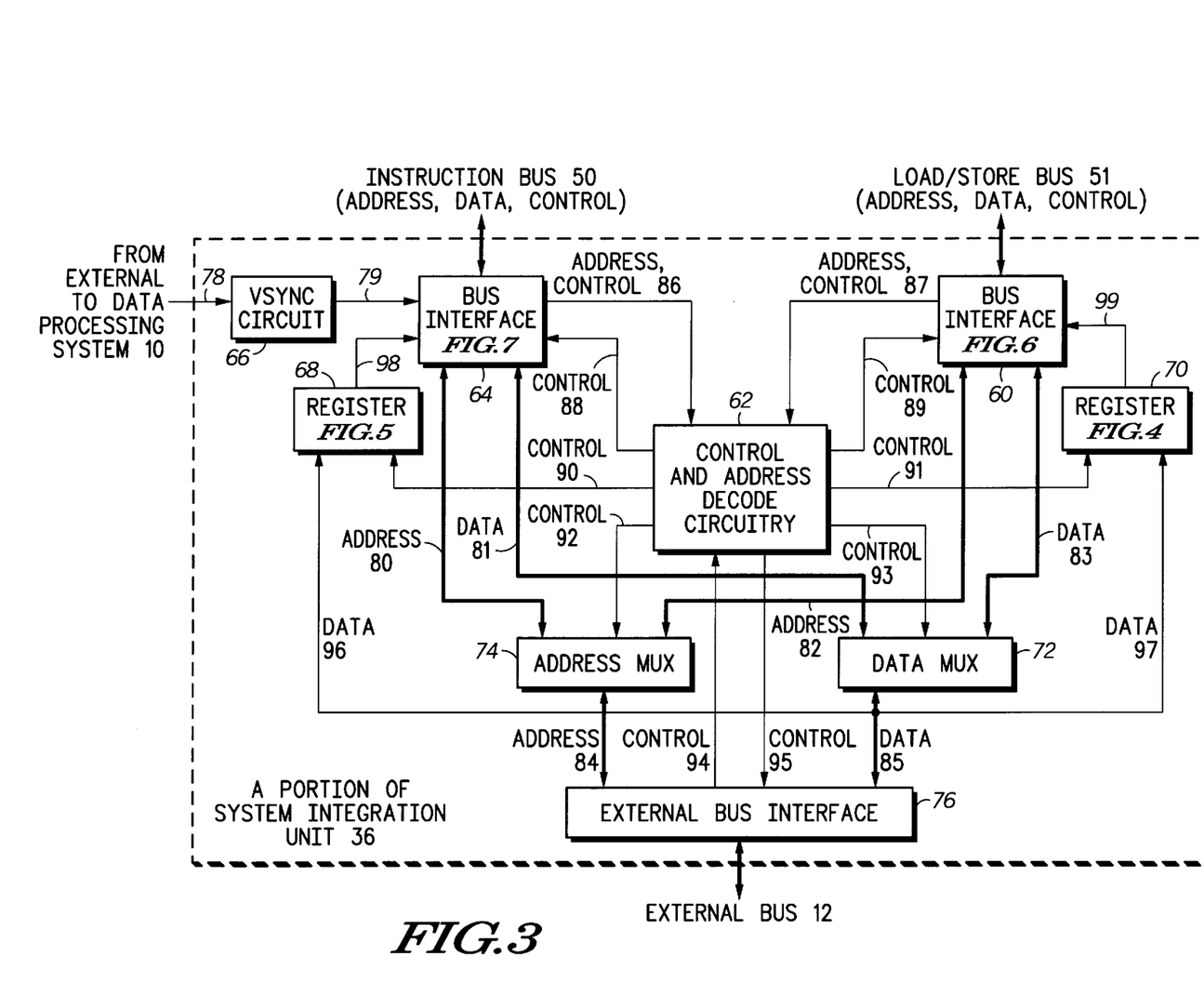
FIG. 3 illustrates, in block diagram form, a portion of system integration unit 36 of FIG. 2 in accordance with one embodiment of the present invention.

FIG. 3 illustrates a portion of system integration unit (SIU) 36 of FIG. 2 in accordance with one embodiment of the present invention. SIU 36 includes a bus interface circuitry 60, control and address decode circuitry 62, bus interface circuitry 64, a VSYNC circuit 66, a register circuit 68, a register circuit 70, a data multiplexer (MUX) circuit 72, an address multiplexer (MUX) circuit 74, and an external bus interface circuit 76. Bus interface 60 is bi-directionally coupled to load/store bus 51 for receiving and providing address, data, and control information. Bus interface 64 is bi-directionally coupled to instruction bus 50 for receiving and providing address, data, and control information. External bus interface 76 is bi-directionally coupled to external bus 12 for receiving and providing address, data, and control information.

Bus interface 60 is bi-directionally coupled to control and address decode circuitry 62 for providing address control signals 87 and for receiving control signals 89. Bus interface 60 is bi-directionally coupled to data MUX 72 by way of data conductors 83. Bus interface 60 is bi-directionally coupled to address MUX 74 by way of address conductors 82. Bus interface 60 is coupled to register 70 by way of one or more conductors 99 for receiving the LSHOW bits 100 (see FIG. 4).

Bus interface 64 is bi-directionally coupled to control and address decode circuitry 62 for providing address control signals 86 and for receiving control signals 88. Bus interface 64 is bi-directionally coupled to data MUX 72 by way of data conductors 81. Bus interface 60 is bi-directionally coupled to address MUX 74 by way of address conductors 80. Bus interface 64 is coupled to register 68 by way of one or more conductors 98 for receiving the ISHOW bits 102 (see FIG. 5).

The VSYNC circuit 66 is coupled to receive a VSYNC signal from external to data processing system 10 by way of terminal 78. In one embodiment of the present invention, the term "terminal" may be any type of apparatus which is used to coupled an integrated circuit to outside circuitry (e.g. integrated circuit bonding pads, solder bumps, integrated circuit pins, etc.). Bus interface 64 is coupled to VSYNC circuit 66 by way of conductor 79 for receiving the VSYNC signal.

Each of registers 68 and 70 is coupled to data bus 85 by way of data conductors 96 and 97, respectively, so that register 68 and 70 may be written by CPU 30 or by any other bus master (not shown) capable of taking mastership of external bus 12 or load/store bus 51. Register 70 receives one or more control signals 91 from control and address decode circuitry 62. Register 68 receives one or more control signals 90 from control and address decode circuitry 62.

Control and address decode circuitry 62 provides one or more control signals 93 to data MUX 72 in order to select whether data bus 83 or data bus 81 is coupled to data bus 85. Control and address decode circuitry 62 provides one or more control signals 92 to address MUX 74 in order to select whether address bus 82 or address bus 80 is coupled to address bus 84. Data MUX 72 is bi-directionally coupled to external bus interface 76 for transferring data values. Address MUX 74 is bi-directionally coupled to external bus interface 76 for transferring address values. Control and address decode circuitry 62 provides one or more control signals 95 to external bus interface 76 in order to synchronize the execution of bus cycles on external bus 12 with the bus cycles being executed on load/store bus 51 and instruction bus 50. External bus interface 76 provides one or more control signals 94 to control and address decode circuitry 62 in order to provide information as to the present state of external bus 12.

Figure 4:
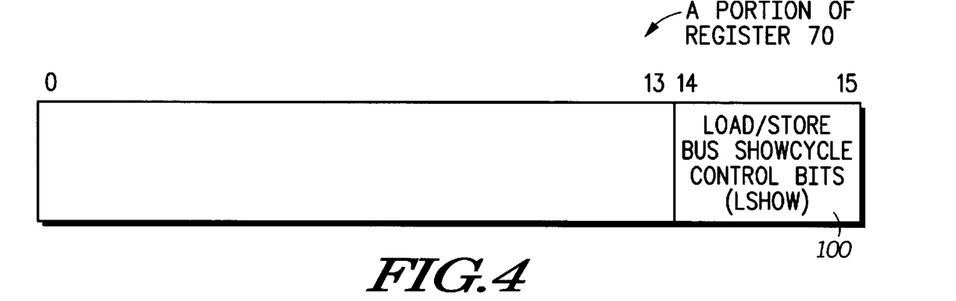
FIG. 4 illustrates, in block diagram form, a portion of register 70 of FIG. 3 in accordance with one embodiment of the present invention.

FIG. 4 illustrates a portion of register 70 of FIG. 3 in accordance with one embodiment of the present invention. In one embodiment of the present invention, register 70 includes a user programmable storage circuit 100 for storing the load/store bus showcycle control bits (LSHOW). In one embodiment of the present invention, the LSHOW bits 100 are read and write accessible by CPU 30 (see FIG. 2). In addition, in some embodiments of the present invention, the LSHOW bits 100 may be read and write accessible by a device (not shown) which is coupled to external bus 12. Alternate embodiments of the present invention may use any number of bits in the LSHOW 100 bit field. Register 70 may be implemented using any type of storage circuit. Although the LSHOW bits 100 in FIG. 4 are illustrated as being located at bits 14–15 of register 70, alternate embodiments of register 70 may locate the LSHOW bits 100 at any bit locations.

Figure 5:
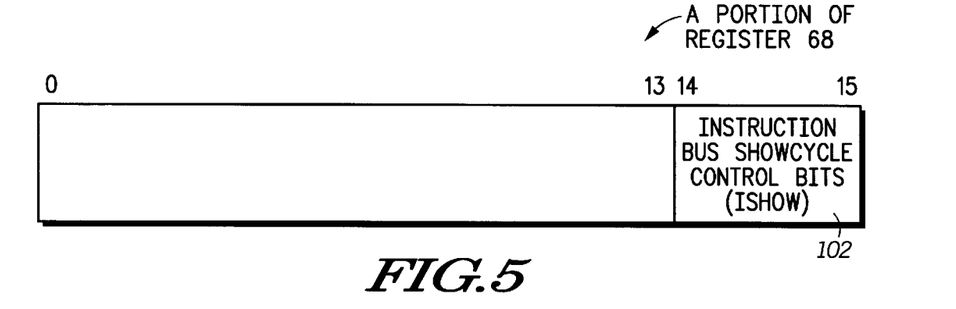
FIG. 5 illustrates, in block diagram form, a portion of register 68 of FIG. 3 in accordance with one embodiment of the present invention.

FIG. 5 illustrates a portion of register 68 of FIG. 3 in accordance with one embodiment of the present invention. In one embodiment of the present invention, register 68 includes a user programmable storage circuit 102 for storing the instruction bus showcycle control bits (ISHOW). In one embodiment of the present invention, the ISHOW bits 102 are read and write accessible by CPU 30 (see FIG. 2). In addition, in some embodiments of the present invention, the ISHOW bits 102 may be read and write accessible by a device (not shown) which is coupled to external bus 12. Alternate embodiments of the present invention may use any number of bits in the ISHOW 102 bit field. Register 68 may be implemented using any type of storage circuit. Although the ISHOW bits 102 in FIG. 5 are illustrated as being located at bits 14–15 of register 68, alternate embodiments of register 68 may locate the ISHOW bits 102 at any bit locations.

Figure 6:
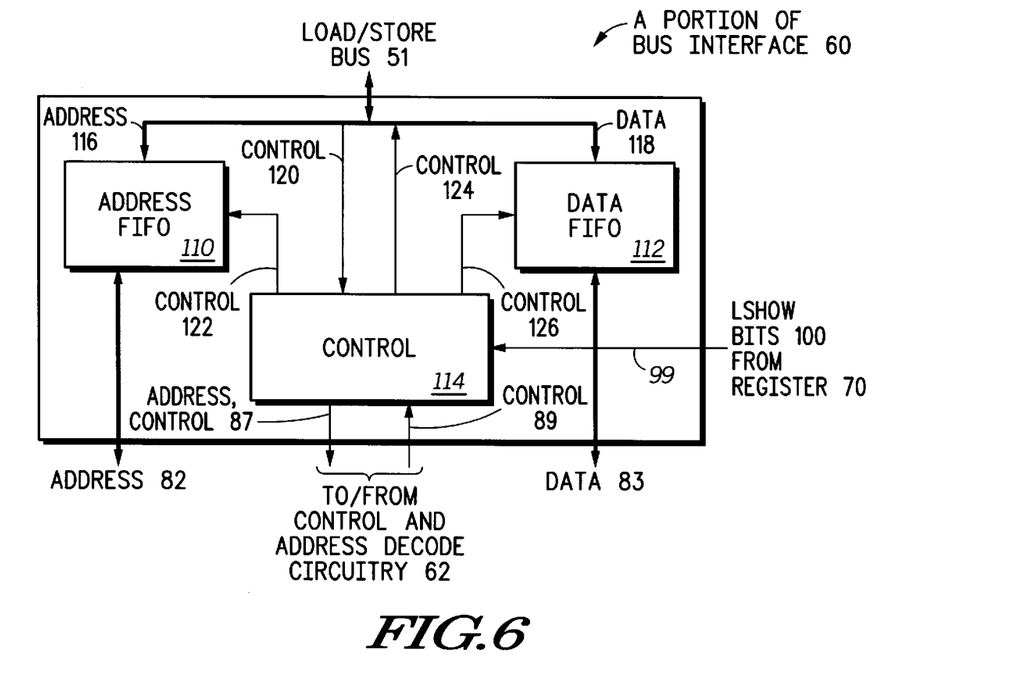
FIG. 6 illustrates, in block diagram form, a portion of bus interface 60 of FIG. 3 in accordance with one embodiment of the present invention.

FIG. 6 illustrates a portion of bus interface 60 of FIG. 3 in accordance with one embodiment of the present invention. Bus interface 60 includes an address FIFO (First In First Out) circuit 110, a data FIFO circuit 112, and a control circuit 114. The address portion of load/store bus 51 is represented by address conductors 116, the data portion of load/store bus 51 is represented by data conductors 118, and the control portion of load/store bus 51 is represented by control conductors 120 and 124. Address FIFO 110 is bi-directionally coupled to load/store bus 51 by way of address conductors 116 for receiving and providing address values. Address FIFO 110 is bi-directionally coupled to address conductors 82 for receiving and providing address values. When showcycles are not being executed on external bus 12 or when there is no need to store address values in address FIFO 110, address FIFO 110 merely passes the address values on without storing them. Alternate embodiments of the present invention may always temporarily store address values in address FIFO 110, regardless of whether or not showcycles are being used.

Data FIFO 112 is bi-directionally coupled to load/store bus 51 by way of data conductors 118 for receiving and providing data values. Data FIFO 112 is bi-directionally coupled to data conductors 83 for receiving and providing data values. When showcycles are not being executed on external bus 12 or when there is no need to store data values in data FIFO 112, data FIFO 112 merely passes the data values on without storing them. Alternate embodiments of the present invention may always temporarily store data values in data FIFO 112, regardless of whether or not showcycles are being used.

Control circuit 114 is used to control the storing and passing of data in and out of FIFOs 110 and 112. Control circuit 114 provides control signals 124 to and receives control signals 120 from load/store bus 51. Control circuit 114 provides control signals 122 to address FIFO 110, and control circuit 114 provides control signals 126 to data FIFO 112. Control circuit 114 receives the LSHOW control bits 100 from register 70 by way of one or more conductors 99. Control circuit 114 is coupled to control and address decode circuitry 62 by way of address control conductor 87 for providing address control information to circuitry 62. Control circuit 114 is also coupled to control and address decode circuitry 62 by way of control conductor 89 for receiving control information.

Figure 7:
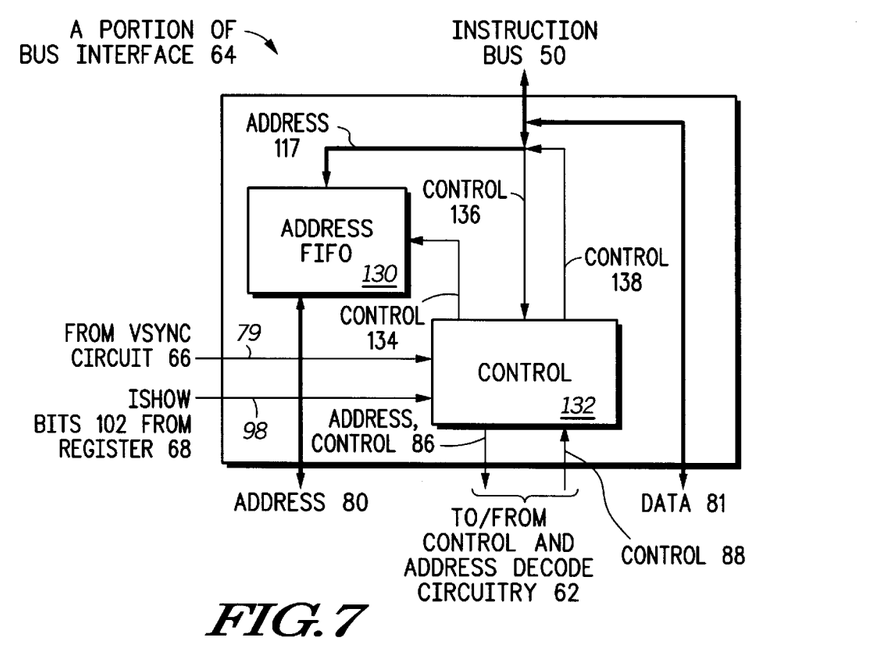
FIG. 7 illustrates, in block diagram form, a portion of bus interface 64 of FIG. 3 in accordance with one embodiment of the present invention.

FIG. 7 illustrates a portion of bus interface 64 of FIG. 3 in accordance with one embodiment of the present invention. Bus interface 64 includes an address FIFO circuit 130 and a control circuit 132. The address portion of instruction bus 50 is represented by address conductors 117 and the control portion of instruction bus 50 is represented by control conductors 136 and 138. Address FIFO 130 is bi-directionally coupled to instruction bus 50 by way of address conductors 117 for receiving and providing address values. Address FIFO 130 is bi-directionally coupled to address conductors 80 for receiving and providing address values. The data portion of instruction bus 50 is bi-directionally coupled to data conductors 81 for transferring data values.

When showcycles are not being executed on external bus 12 or when there is no need to store address values in address FIFO 130, address FIFO 130 merely passes the address values on without storing them. Alternate embodiments of the present invention may always temporarily store address values in address FIFO 130, regardless of whether or not showcycles are being used. In one embodiment of the present invention, bus interface 64 does not have a data FIFO. However, alternate embodiments of bus interface 64 may have a data FIFO similar to data FIFO 112 in bus interface 60 (see FIG. 6).

Control circuit 132 is used to control the storing and passing of addresses in and out of FIFO 130. Control circuit 132 provides control signals 138 to and receives control signals 136 from instruction bus 50. Control circuit 132 provides control signals 134 to address FIFO 130. Control circuit 132 receives the ISHOW control bits 102 from register 68 by way of one or more conductors 98. Control circuit 132 receives the VSYNC signal from VSYNC circuit 66 by way of conductor 79. Control circuit 132 is coupled to control and address decode circuitry 62 by way of address control conductor 86 for providing address control information to circuitry 62. Control circuit 132 is also coupled to control and address decode circuitry 62 by way of control conductor 88 for receiving control information.

Figure 8:
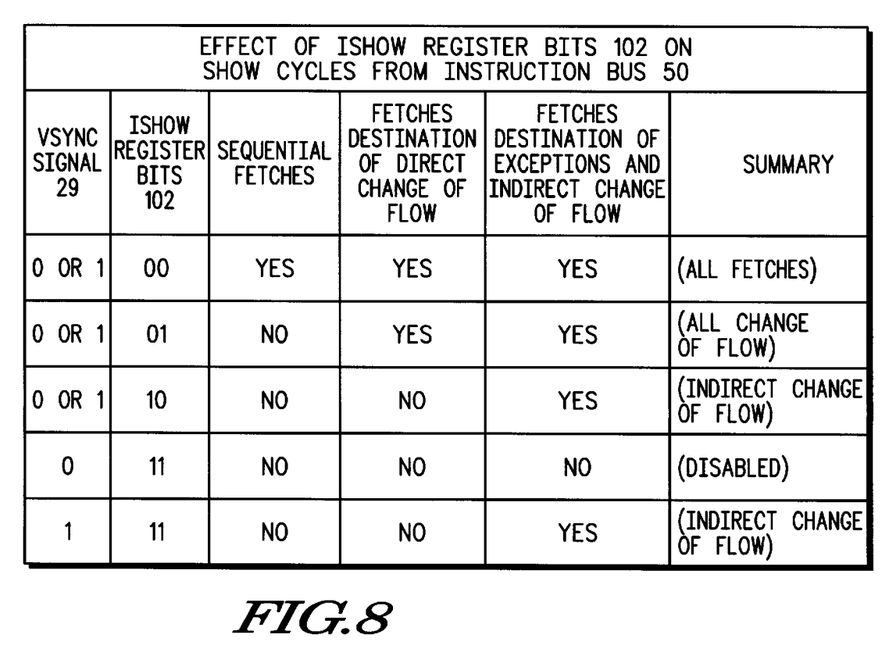
FIG. 8 illustrates, in tabular form, the effect of ISHOW register bits 102 on show cycles from instruction bus 50 in accordance with one embodiment of the present invention.

FIG. 8 illustrates, in tabular form, the effect of ISHOW register bits 102 (see FIG. 5) on show cycles from instruction bus 50 (see FIG. 3) in accordance with one embodiment of the present invention. The values of the ISHOW register bits 102 are given in binary form. The term "direct change of flow", as used in this document, refers to a change in a software program flow in which the destination address is known or can be determined before the program is executed. The term "indirect change of flow", as used in this document, refers to a change in a software program flow in which the destination address is not known and cannot be determined before the program is executed. Alternate embodiments of the present invention may use different definitions of "direct change of flow" and "indirect change of flow", and may use different categorizations than those used in FIG. 8.

Figure 9:
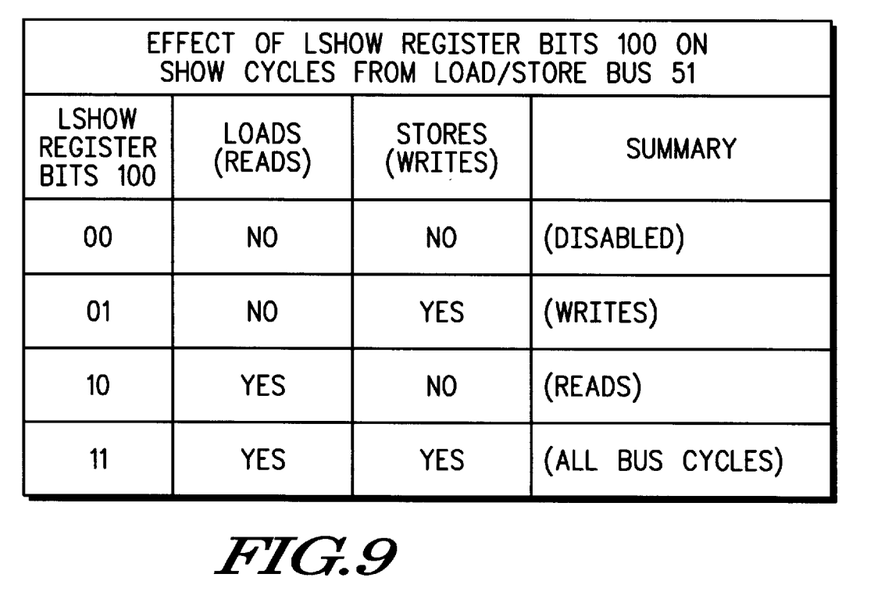
FIG. 9 illustrates, in tabular form, the effect of LSHOW register bits 100 on show cycles from load/store bus 50 in accordance with one embodiment of the present invention.
Figure 10:
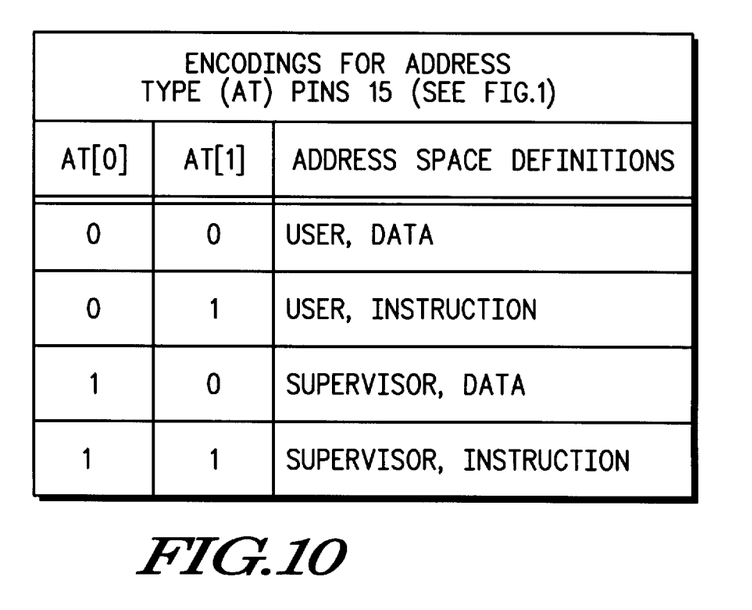
FIG. 10 illustrates, in tabular form, the encodings for the address type integrated circuit terminals 15 of FIG. 1 in accordance with one embodiment of the present invention.
Figure 13:
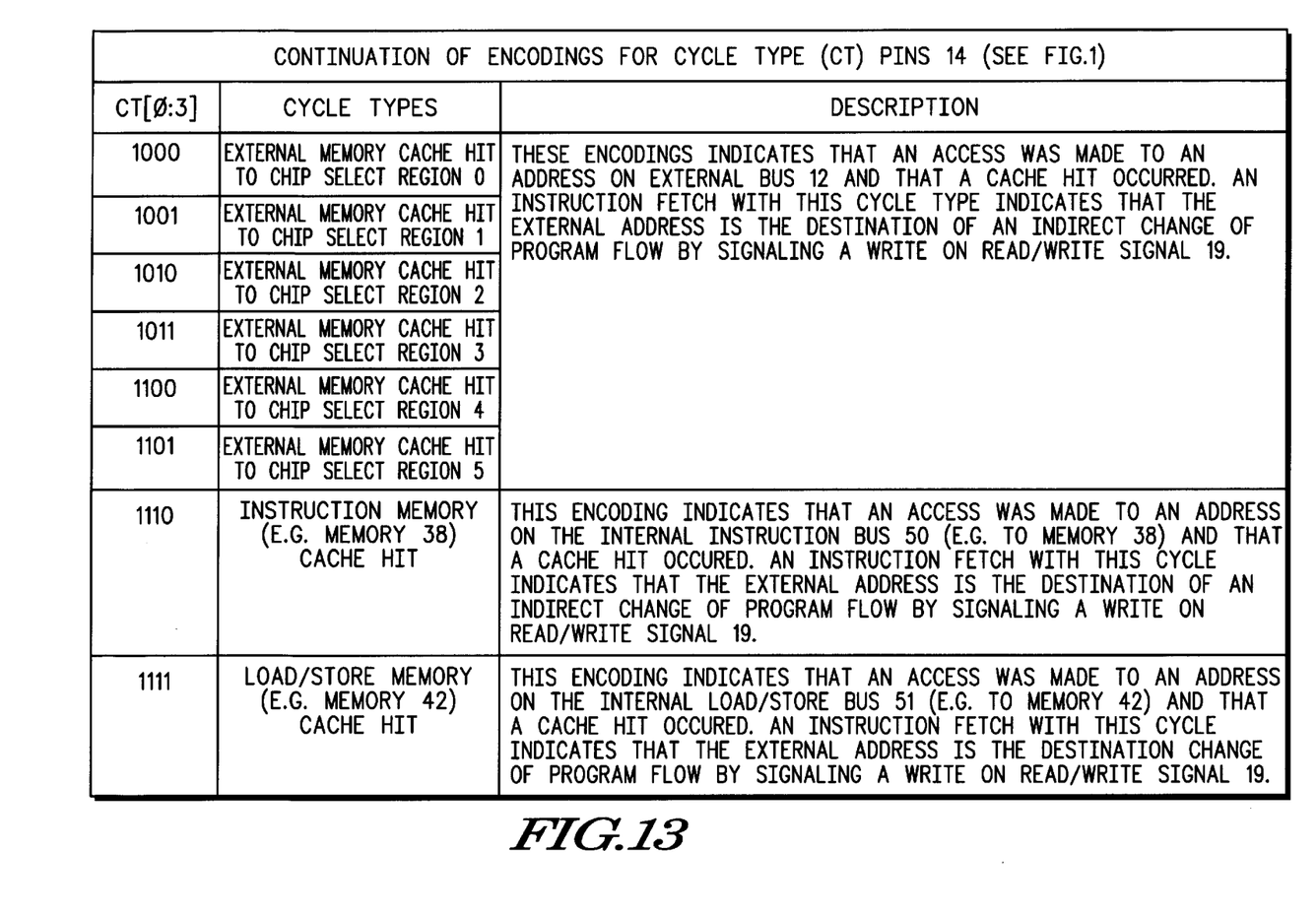
FIG. 13 illustrates, in tabular form, a continuation of the encodings for the cycle type integrated circuit terminals 14 of FIG. 1 in accordance with one embodiment of the present invention.

FIG. 9 illustrates, in tabular form, the effect of LSHOW register bits 100 (see FIG. 4) on show cycles from load/store bus 51 (see FIG. 3) in accordance with one embodiment of the present invention. The values of the LSHOW register bits 100 are given in binary form. FIG. 10 illustrates, in tabular form, the encodings for the address type (AT) integrated circuit terminals 15 of FIG. 1 in accordance with one embodiment of the present invention. The values of AT[0] and AT[1] are given in binary form. FIGS. 11–13 illustrate, in tabular form, the encodings for the cycle type (CT) integrated circuit terminals 14 of FIG. 1 in accordance with one embodiment of the present invention. The values of CT[0:3] are given in binary form. Note that alternate embodiments of the present invention may use different encoding for the ISHOW register bits 102, the LSHOW register bits 100, the address type signals 15, and the cycle type signals 14.

OPERATION OF THE PREFERRED EMBODIMENT

The operation of the present invention will now be discussed. The present invention provides a method and apparatus for more easily debugging software being executed by a data processing system 10. As bus cycles performed on internal busses (e.g. busses 50 and 51 in FIG. 2) are not necessarily driven on external bus 12, show cycles are used to make bus cycles from internal busses visible on an external bus (e.g. bus 12 in FIG. 2). Referring to FIG. 1, data processing system 10 provides cycle type signals 14 external to data processing system 10. External debugging hardware and software (not shown) can use the cycle type signals 14 to determine a variety of information about the activity and bus cycles being performed within data processing system 10, activity which is not readily discernible except by way of the cycle type signals 14. In some cases the information provided by the cycle type signals 14 is sufficient for debug purposes; in other cases, information from additional signals (e.g. the address type signals 15 and the read/write signal 19) may also be required.

In one embodiment of the present invention, data processing system 10 (see FIG. 2) uses a RISC (reduced instruction set computer) architecture which has three internal busses, namely instruction bus 50, load/store bus 51, and intermodule bus 52. However, note that all CPU 30 accesses to intermodule bus 52 also require the use of load/store bus 51 (i.e. by way of bus interface 40). Thus, by monitoring the bus cycles on only instruction bus 50 and load/store bus 51, the user is able to monitor all CPU accesses, even the accesses to intermodule bus 52. Alternate embodiments of the present invention may have any type of internal architecture and may have any number of internal busses. In addition, there may be one set of register control bits to control show cycles for all of the internal busses, to control show cycles for a subset of the internal busses, or to control show cycles for each internal bus.

Referring to FIG. 2, in one embodiment of the present invention, instruction bus 50 and load/store bus 51 each have a separate set of register control bits to control show cycles. In one embodiment of the present invention, these register control bits are duplicates of each other; in an alternate embodiment, the register control bits for each bus are different to allow the show cycles for each bus to be customized based on the information transferred across each bus.

For one embodiment of the present invention, FIG. 8 illustrates the functionality of the register control bits "ISHOW" 102 which are used as the register control bits for instruction bus 50 in one embodiment of the present invention. Likewise, for one embodiment of the present invention, FIG. 9 illustrates the functionality of the register control bits "LSHOW" 100 which are used as the register control bits for load/store bus 51 in one embodiment of the present invention.

The functionality of the ISHOW bits 102 and the LSHOW bits 100 was chosen based on a set of assumptions which were made regarding the software to be executed by CPU 30 (see FIG. 2). The first assumption is that there are generally fewer write cycles than read cycles in a software program. Also, if the contents of memory are known before a bus analyzer starts capturing data, it is not necessary to monitor the read cycles. Second, instruction execution may be assumed for sequential program flow. Show cycles are not necessary for these sequentially executed instructions if source code is available to a debugger. Third, unconditional direct branches may be treated as sequentially executed instructions. And fourth, conditional direct branches may be treated as sequentially executed instructions if a separate mechanism is provided to indicate whether the branch was taken or not taken.

Alternate embodiments of the present invention may define the functionality of the register control bits (e.g. ISHOW bits 102 and the LSHOW bits 100) in a different manner, based upon the assumptions which are made regarding the software to be executed by the CPU (e.g. CPU 30 in FIG. 2).

Referring to the "SUMMARY" column of the table in FIG. 8, in one embodiment of the present invention, the ISHOW bits 102 provide the following visibility options for instruction bus 50 fetch cycles: (1) if ISHOW=%00, show all internal fetch cycles of instruction bus 50; (2) if ISHOW=%01, show only the internal fetch cycles of instruction bus 50 which have a change of program flow destination; (3) if ISHOW=%10, show only the internal fetch cycles of instruction bus 50 which have an indirect change of program flow destination; and (4) if ISHOW=%11, show no internal fetch cycles of instruction bus 50. Note the default reset value of the ISHOW bits 102 may be selected to be any predetermined value; however, in one embodiment of the present invention, the default reset value of the ISHOW bits 102 is %00.

Referring to the "SUMMARY" column of the table in FIG. 9, in one embodiment of the present invention, the LSHOW bits 100 provide the following visibility options for load/store bus 51 bus cycles: (1) if LSHOW=%11, show all internal bus cycles of load/store bus 51; (2) if LSHOW=%01, show only internal write (i.e. store) cycles of load/store bus 51; (3) if LSHOW=%10, show only internal read (i.e. load) cycles of load/store bus 51; and (4) if LSHOW=%00, show no internal bus cycles of load/store bus 51. Note the default reset value of the LSHOW bits 100 may be selected to be any predetermined value; however, in one embodiment of the present invention, the default reset value of the LSHOW bits 100 is %00.

Note that alternate embodiments of the present invention may provide different visibility options. For example, the register control bits (e.g. ISHOW bits 102 and LSHOW bits 100) may include more than two bits which can be used to select even more visibility options, or less than two bits which can be used to select fewer visibility options. The functionality of the present invention illustrated in FIGS. 8 and 9 is just one possible embodiment of the present invention. By providing separate register control bits ISHOW 102 and LSHOW 100, one embodiment of the present invention provides individual control for both operand show cycles on load/store bus 51 and for instruction fetch cycles on instruction bus 50. Thus the amount of visibility for instructions and operands may be separately selected, ranging from complete visibility, to partial visibility, to no visibility. This allows a significant improvement over the prior art which simply enabled or disabled all show cycles.

FIG. 5 illustrates the location of the ISHOW register control bits 102 in register 68; while FIG. 4 illustrates the location of the LSHOW register control bits 100 in register 70. FIG. 3 illustrates the location of register 68 and register 70 in the system integration unit 36. FIG. 2 illustrates the location of the system integration unit 36 in relation to the instruction bus 50, the load/store bus 51, and the external bus 12.

FIG. 7 illustrates, in more detail, how the functionality of the ISHOW register control bits 102 is implemented in one embodiment of the bus interface 60 of FIG. 3. Likewise, FIG. 6 illustrates, in more detail, how the functionality of the LSHOW register control bits 100 is implemented in one embodiment of the bus interface 64 of FIG. 3.

Referring to FIG. 1, in one embodiment of the present invention, the cycle type signals 14, the address type signals 15, the address signals 16, the data signals 18, and the read/write signal 19 are used during the show cycles on external bus 12. The cycle type signals 14 are used to indicate the location of the memory (e.g. memory 38 in FIG. 2) or port (e.g. integrated circuit terminals 45 in FIG. 2) that is being accessed. The encodings for the cycle type signals 14 for one embodiment of the present invention are illustrated in FIGS. 11–13. The address type signals 15 are used to indicate whether the bus cycle on external bus 12 is transferring an instruction or data. The encodings for the address type signals 15 for one embodiment of the present invention are illustrated in FIG. 10. The address signals 16 and the data signals 18 serve the same standard function during show cycles as they do during normal bus cycles.

Note that the read/write signal 19 serves the same standard function during show cycles as it does during normal bus cycles, except during instruction showcycles. Since instruction fetches are assumed to be read operations, the read/write signal 19 may be used to convey information other than read/write information during showcycles. For example, referring to FIGS. 11–13, in one embodiment of the present invention, during instruction fetches the read/write signal 19 is used to convey non-read/write information for all encoding except %0000, %0001, %0011, and %0111. Alternate embodiments of the present invention may use more, fewer, or different signals to communicate whatever information is desired during show cycles.

In addition, the timing relationships between the various signals of external bus 12 (see FIG. 1) may vary significantly for different embodiments of the present invention. For example, the timing relationship between the various signals of external bus 12 may vary significantly depending upon whether or not address bus 16 and data bus 18 are pipelined busses and/or are split-transaction busses. Also, in alternate embodiments of the present invention, address bus 16 and data bus 18 may be time multiplexed onto the same set of conductors, rather than using separate sets of conductors as illustrated in FIG. 1.

In one embodiment of the present invention, the read/write signal 19 (see FIG. 1) serves a different function during instruction fetch showcycles. During normal bus cycles, the read/write signal 19 functions in the same manner as a prior art read/write signal. During normal bus cycles (i.e. non-showcycles), one logic state of the read/write signal 19 indicates that the present bus cycles is a read, while the other logic state of the read/write signal 19 indicates that the present bus cycles is a write. However, during an instruction fetch showcycle, the read/write signal 19 indicates whether or not the address of the present bus cycle is the destination for a change in the software program flow. Thus, in one embodiment of the present invention, changes in the software program flow being executed by CPU 30 (see FIG. 2) can be determined from external to data processing system 10 by monitoring the read/write signal 19 in conjunction with the address type signals 15 and the cycle type signals 14. In one embodiment of the present invention, the address signals 16 (see FIG. 1) provide the information as to the destination address itself.

Referring to FIGS. 1, 2, and 11–13, in one embodiment of the present invention the cycle type signals 14, sometimes in conjunction with the address type signals 15 and the read/write signal 19, are used to convey the following information. First, whether the current external bus cycle is an access to an external resource (CT[0:3]=%0000 through %0011, see FIGS. 11–13), or whether the current external bus cycle is a show cycle corresponding to an access to an internal resource (CT[0:3]=%0100 through %1111). Second, whether the current external bus cycle is a reservation operation (CT[0:3]=%0001 in conjunction with address type signals 15). Third, whether the current external bus cycle is an indirect change of program flow access to external non-debug resources (CT[0:3]=%0001 in conjunction with address type signals 15).

Fourth, whether the current external bus cycle is an access to an external debug resource (for CT[0:3]=%0010 the external debug resource is emulation memory, and for CT[0:3]=%0011 the external debug resource is a port replacement unit). Fifth, whether the current external bus cycle is an access to an internal resource, and if so, which internal resource is being accessed (for CT[0:3]=%0100 the internal resource is on instruction bus 50, e.g. memory 38; for CT[0:3]=%0101, the internal resource is on load/store bus 51, e.g. memory 42; for CT[0:3]=%0111, the internal resource is registers inside SIU 36, e.g. registers 68 and 70, or registers within modules 44, 46, or 48 that are on the intermodule bus 52). Sixth, an indication that there has been a hit to an internal cache (for CT[0:3]=%0110 and for CT[0:3]=%1000 through %1111). Seventh, for cache hits, an indication of which external or internal resource would have been accessed if the cache has missed instead of hit (for CT[0:31]=%0110 and for CT[0:3]=%1000 through %1111).

And eighth, an indication of indirect changes of program flow fetches to internal resources, including an internal cache, using the cycle type signals 14 in conjunction with the address type signals 15 and the read/write signal 19 (for CT[0:3]=%0100 through %1111, with the exception of CT[0:3]=%0111). Of course, alternate embodiments of the present invention may convey only some of this information, may convey additional information, or may convey different information. The information conveyed by the cycle type signals 14 may be used to more easily debug a software program being executed by data processing system 10 (see FIG. 1). However, the particular encodings of the cycle type signals 14 may be varied, and alternate embodiments of the present invention may use fewer or more cycle type signals 14. In conjunction with the cycle type signals 14, alternate embodiments of the present invention may use no signals or may use signals other than the address type signals 15 and the read/write signal 19 to convey debug related information external to data processing system 10.

Still referring to FIGS. 1, 2, and 11–13, the cycle type signals 14 are especially useful in a data processing system 10 in which address signals 16 are only a partial subset of the full number of address signals provided by one or more internal busses (e.g. load/store bus 51 in FIG. 2). The reason being that the cycle type signals 14 may be used to specify which resource is the destination of a present bus cycle, instead of requiring all of the address signal on external bus 12 to be used to specify the destination resource by address location. For example, where some of the address terminals for external bus 12 are used to provide chip select signals, instead of address signals, the full address is not provided external to data processing system 10 by way of external bus 12. Thus, the cycle type signals 14 can be used in some cases, instead of the address signals, to determine which resource is the destination of a present bus cycle.

Referring to FIG. 3, in one embodiment of the present invention, a VSYNC signal 78 is received from external to data processing system 10 by way of an integrated circuit bonding pad, an integrated circuit pin, or some other electrical conductor. Note that the VSYNC signal 78 may be encoded using multiple integrated circuit bonding pads, may be encoded in a serial bit stream, may be provided to an integrated circuit bonding pad in a time multiplexed manner, or may be provided to data processing system 10 in any possible discernible form. In one embodiment of the present invention, the VSYNC signal 78 is provided to bus interface 64 as illustrated in FIG. 7. Note that in one embodiment of the present invention, the VSYNC circuit 66 illustrated in FIG. 3 is merely a latch which is used to latch and store the externally provided signal. In alternate embodiments of the present invention, the VSYNC circuit 66 may perform simple logical operations, complex logical operations, or may merely provide a timing or gating function.

In one embodiment of the present invention, the latched value of the VSYNC signal 78 is provided to bus interface 64 by way of conductor 79. Referring to FIG. 7 and FIG. 8, the effect of the ISHOW bits 102 on the circuitry of bus interface 64 may also be a function of the logic state of the VSYNC signal 78. In one embodiment of the present invention, the VSYNC signal 78 only affects the circuitry of bus interface 64 when ISHOW=%11. In one embodiment of the present invention, if ISHOW=%11 and VSYNC=%0, then the behavior of the show cycles is not affected (i.e. show no internal fetch cycles of instruction bus 50). However, in this same embodiment, if ISHOW=%11 and VSYNC=%1, then the behavior of the show cycles is affected (i.e. show only the internal fetch cycles of instruction bus 50 which have an indirect change of program flow destination).

The register control bits ISHOW 102 and LSHOW 100 give the user a software mechanism to control show cycles. The VSYNC signal 78 gives the user a hardware mechanism to control show cycles which does not interfere with the software program that is being executed and debugged. The functionality of one or more register control bits can be combined with the functionality of one or more externally provided signals to allow the user a wide range of control over the show cycles provided on external bus 12. The user is thus able to continuously select and change which information is provided by way of show cycles on external bus 12. As a result, the difficulty of debugging software program code can potentially be reduced.

Referring to FIG. 2, in one embodiment of the present invention, data processing system 10 is implemented on a single integrated circuit. In alternate embodiments of the present invention, data processing system 10 may be implemented using a plurality of integrated circuits. The software program which is executed by CPU 30 may be stored in one or more of instruction cache 34, memory 38, and external memory (not shown) which is external to data processing system 10 and which is coupled to external bus 12. Instruction bus 50 is used to transfer instructions from memory 38 and/or from an external memory (not shown) which is coupled to external bus 12. Load/store bus 51 is used to transfer data to or from memory 42 and to or from an external memory (not shown) which is coupled to external bus 12. Bus interface 40 is used to transfer information between load/store bus 51 and intermodule bus 62.

Various modules (e.g. 44, 46, and 48) may be coupled to intermodule bus 52. These modules 44, 46, and 48 may perform any type of function, for example, timing functions, serial communication functions, digital to analog conversions, etc. One or more of modules 44, 46, and 48 may be coupled external to data processing system 10 by way of integrated circuit terminals (not shown). For example, a serial communication module (e.g. module 44) may require at least one external conductor (e.g. conductor 45) in order to receive serial communications from external to data processing system 10.

Sequencer 32 in CPU 30 is used to control the execution of instructions received by CPU 30 from instructions bus 50 or from instructions cache 34. Sequencer 32 may be implemented as one or more state machines, combinational logic, one or more programmable logic array, memory, or a combination of these.

System integration unit (SIU) 36 is used to interface data processing system 10 to an external bus 12 in order to provide information to and receive information from external to data processing system 10. A portion of SIU 36 is illustrated in FIG. 3.

FIG. 3 illustrates a portion of SIU 36 in accordance with one embodiment of the present invention. Control and address decode circuitry 62 is used to control the transfer of information between instructions bus 50, load/store bus 51, and external bus 12. Address MUX 74, under control of circuitry 62, determines whether the source or destination of an address value is instructions bus 50 or load/store bus 51. Data MUX 72, under control of circuitry 62, determines whether the source or destination of a data value is instructions bus 50 or load/store bus 51. Bus interface 60 is used to buffer the exchange of information between load/store bus 51 and external bus 12. Bus interface 64 is used to buffer the exchange of information between instructions bus 50 and external bus 12.

FIG. 6 illustrates one possible embodiment of bus interface 60. In order to perform showcycles in the illustrated embodiment of the present invention, storage circuits (e.g. address FIFO 110 and data FIFO 112) are required to hold address values and data values from load/store bus 51 bus cycles until the external bus 12 is available. Once external bus 12 is available, the showcycle can be performed on external bus 12 by providing the stored address values and stored data values from address FIFO 110 and data FIFO 112.

Still referring to FIG. 6, in one embodiment of the present invention, if address FIFO 110 or data FIFO 122 are filled, further bus cycles on load/store bus 51 are held up until FIFOs 110 and 112 are no longer full. In some embodiments of the present invention, only selected bus cycles on load/store bus 51 are held up, namely those bus cycles which need to be showcycled on external bus 12. Bus cycles on load/store bus 51 which will not be showcycled on external bus 12 do not need to be held up and can be executed even if FIFOs 110 and 112 are full. Control 114 is used to control the filling and emptying of FIFOs 110 and 112 as well as the transfer of address and data values between load/store bus 51 and both address bus 82 and data bus 83. Control 114 receives control signals 89 from control and address decode circuitry 62 (see FIG. 3), and control 114 provides address control signals 87 to control and address decode circuitry 62.

FIG. 7 illustrates one possible embodiment of bus interface 64. In order to perform showcycles in the illustrated embodiment of the present invention, a storage circuit (e.g. address FIFO 130) is required to hold address values from instruction bus 50 bus cycles until the external bus 12 is available. Once external bus 12 is available, the showcycle can be performed on external bus 12 by providing the stored address values from address FIFO 130. Note that in one embodiment of the present invention, instruction show cycles, which provide external visibility of instruction bus 50, only provided address values on external bus 12. No data values from instruction bus 50 are provided on external bus 12. Thus bus interface 64 only requires one FIFO, namely an address FIFO 130 to store address values. In the illustrated embodiment of the present invention a data FIFO is not required because it is assumed that the data values are ascertainable directly from the software program source code. However, alternate embodiments of the present invention may include a data FIFO.

Still referring to FIG. 7, in one embodiment of the present invention, if address FIFO 130 is filled, further bus cycles on instruction bus 50 are held up until FIFO 130 is no longer full. In some embodiments of the present invention, only selected bus cycles on instruction bus 50 are held up, namely those bus cycles which need to be showcycled on external bus 12. Bus cycles on instruction bus 50 which will not be showcycled on external bus 12 do not need to be held up and can be executed even if FIFO 130 is full. Control 132 is used to control the filling and emptying of FIFO 130 as well as the transfer of address values between instruction bus 50 and address bus 80. Control 132 receives control signals 88 from control and address decode circuitry 62 (see FIG. 3), and control 132 provides address control signals 86 to control and address decode circuitry 62.

Although one embodiment of the present invention uses a FIFO depth of two, alternate embodiments of the present invention may use any depth FIFO for FIFOs 110, 112, and 130. Also, alternate embodiments of the present invention may use other types of storage circuits instead of FIFOs. Although the ISHOW control bits 102 and the LSHOW control bits 100 have been illustrated as being located as part of SIU 36, in alternate embodiments of the present invention, the ISHOW control bits 102 and the LSHOW control bits 100 may be located anywhere within data processing system 10.

Note that in some embodiments of the present invention, selected activity internal to data processing system 10, which is not normally transferred across any of the internal busses 50–52, may be provided on external bus 12 during showcycles by way of one or more internal busses 50–52. For example, referring to FIG. 2, the address, data, and control information corresponding to a hit in instruction cache 34 may be provided to external bus 12 during showcycles by way of instruction bus 50. Note that CPU 30 or instruction cache 34 may use the ISHOW control bits 102 to determine whether or not to provide information on instruction bus 50.

In conclusion, the functionality of one or more register control bits can be combined with the functionality of one or more externally provided signals to allow the user a wide range of control over the show cycles provided on external bus 12. The user is thus able to continuously select and change which information is provided by way of show cycles on external bus 12. As a result, the difficulty of debugging software program code can potentially be reduced. Of course, some embodiments of the present invention may use only register control bits, or alternately may use only externally provided signals, to allow user control over the show cycles provided on external bus 12.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

We claim:

1. A method for operating a data processing system, the data processing system having an internal bus, having an external bus, and having an internal cache, the external bus providing information external to the data processing system, the method comprising the steps of:

performing a first internal bus cycle which is provided to the external bus during normal operation;

providing the first internal bus cycle on the external bus;

providing a cycle type signal on the external bus, the cycle type signal denoting a first type associated with the first internal bus cycle;

performing a second internal bus cycle which is not provided to the external bus during normal operation;

providing the second internal bus cycle on the external bus during an external bus show cycle; and providing the cycle type signal on the external bus during the external bus show cycle, the cycle type signal denoting a second type associated with the second internal bus cycle.

2. A method as in claim 1, wherein the cycle type signal denoting the second type and the associated second internal bus cycle are available concurrently during the external bus show cycle.

3. A method as in claim 1, further comprising the steps of:

performing a third internal bus cycle which is not provided to the external bus during normal operation;

providing the third internal bus cycle on the external bus during a second external bus show cycle; and providing the cycle type signal on the external bus during the second external bus show cycle, the cycle type signal denoting a third type associated with the third internal bus cycle; and wherein the third type indicates that an indirect change of program flow occurred as a result of the third internal bus cycle.

4. A method as in claim 3, wherein the cycle type signal includes a plurality of signals and the method further comprises providing a read/write signal and an address type signal, the read/write and address type signals indicating a change of program flow associated with an instruction fetch.

5. A method as in claim 1, further comprising the steps of:
performing a third internal bus cycle; and
providing the third internal bus cycle on the external bus while also providing the cycle type signal on the external bus, the cycle type signal indicating if the third internal bus cycle is a reservation cycle.

6. A method as in claim 5, wherein the cycle type signal includes a plurality of signals and the method further comprises the step of providing an address type signal.

7. A method as in claim 1, further comprising the steps of:
performing a third internal bus cycle; and
providing the third internal bus cycle on the external bus while also providing the cycle type signal on the external bus, the cycle type signal indicating if the third internal bus cycle is to an emulation memory external to the data processing system.

8. A method as in claim 7, wherein the cycle type signal includes a plurality of signals.

9. A method as in claim 1, further comprising the steps of:
performing a third internal bus cycle; and
providing the third internal bus cycle on the external bus while also providing the cycle type signal on the external bus, the cycle type signal indicating if the third internal bus cycle is to a port replacement unit which is external to the data processing system and which replaces internal registers within the data processing system.

10. A method for operating a data processing system, the data processing system having an internal bus and having an external bus, the external bus providing information external to the data processing system, the method comprising the steps of:
performing a first internal bus cycle which is provided to the external bus during normal operation;
providing the first internal bus cycle on the external bus;
performing a second internal bus cycle which is not provided to the external bus during normal operation;
providing the second internal bus cycle on the external bus during an external bus show cycle; and
providing a cycle type signal on the external bus during the external bus show cycle, the cycle type signal indicating a destination resource of the second internal bus cycle.

11. A method as in claim 10, further comprising the steps of:
performing a third internal bus cycle; and
providing the third internal bus cycle on the external bus while also providing the cycle type signal on the external bus, the cycle type signal indicating a destination resource of the third internal bus cycle.

12. A method as in claim 11, wherein the destination resource of the second internal bus cycle is an emulation memory external to the data processing system.

13. A method as in claim 11, wherein the destination resource of the second internal bus cycle is a port replacement unit which is external to the data processing system and which replaces internal registers within the data processing system.

14. A method for operating a data processing system, the data processing system having an internal bus and having an external bus, the external bus providing information external to the data processing system, the method comprising the steps of:
performing a first internal bus cycle which is provided to the external bus during normal operation;
providing the first internal bus cycle on the external bus;
performing a second internal bus cycle which is not provided to the external bus during normal operation;
providing the second internal bus cycle on the external bus during an external bus show cycle; and
providing cycle type signal on the external bus during the external bus show cycle, the cycle type signal indicating if an indirect change of program flow occurred as a result of the second internal bus cycle.

15. A data processor, comprising:
a plurality of external bus terminals for providing address and data information external to the data processor;
an internal bus for performing an internal bus cycle;
a bus interface circuit, coupled between said internal bus and said plurality of external bus terminals, said bus interface circuit transferring the address and data information between said internal bus and said plurality of external bus terminals; and
at least one integrated circuit terminal for providing a cycle type signal, the cycle type signal indicating an instruction type associated with the address and data information provided external to the data processor, the cycle type signal indicating an external target device associated with the address and data information provided external to the data processor.

16. A data processor as in claim 15, wherein the cycle type signal indicates if the internal bus cycle is to an emulation memory external to the data processing system.

17. A data processor as in claim 15, further comprising:
a central processing unit, coupled to said internal bus; and
a cache, coupled to said central processing unit;
wherein the cycle type signal indicates if there was a cache hit on the cache during the internal bus cycle.

18. A data processor as in claim 15, wherein the cycle type signal indicates if the internal bus cycle is a reservation cycle.

19. A data processor as in claim 15, wherein the cycle type signal indicates if an indirect change of program flow occurred as a result of the internal bus cycle.

20. A data processor, comprising:
a plurality of external bus terminals for providing information external to the data processor;
at least one internal bus for performing internal bus cycles;
a system integration unit, coupled between said at least one internal bus and said plurality of external bus terminals, said system integration unit transferring the address and data information between said at least one internal bus and said plurality of external bus terminals, said system integration unit providing internal bus cycle information as an external indicator; and
at least one integrated circuit terminal for receiving the external indicator from the system integration unit and providing the external indicator external to the data processor; and
wherein if the external indicator is a first value an internal cache was hit.

21. A data processor as in claim 20, wherein the external indicator is a plurality of signals.

22. A data processor as in claim 20, wherein the system integration unit provides at least one internal cycle external to the data processor; and
wherein if the external indicator is a second value the at least one internal cycle accomplishes a branch path.

* * * * *